(12) United States Patent
Ishibashi et al.

(10) Patent No.: US 12,508,962 B2
(45) Date of Patent: Dec. 30, 2025

(54) VEHICLE AND VEHICLE SEAT

(71) Applicant: KAWASAKI MOTORS, LTD., Hyogo (JP)

(72) Inventors: Kazuki Ishibashi, Hyogo (JP); Takashi Hisamura, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 231 days.

(21) Appl. No.: 18/341,573

(22) Filed: Jun. 26, 2023

(65) Prior Publication Data
US 2024/0424962 A1 Dec. 26, 2024

(51) Int. Cl.
| | |
|---|---|
| *B60N 2/38* | (2006.01) |
| *B60N 2/64* | (2006.01) |
| *B60N 2/68* | (2006.01) |
| *B60N 2/803* | (2018.01) |

(52) U.S. Cl.
CPC ............ *B60N 2/38* (2013.01); *B60N 2/64* (2013.01); *B60N 2/688* (2013.01); *B60N 2/803* (2018.02)

(58) Field of Classification Search
CPC .. B60N 2/38; B60N 2/01; B60N 2/986; B60R 2022/1843; B60R 2022/027
See application file for complete search history.

(56) References Cited

U.S. PATENT DOCUMENTS

| | | | | |
|---|---|---|---|---|
| 3,600,036 A | * | 8/1971 | Iskander | A47B 87/005 297/445.1 |
| 4,382,628 A | * | 5/1983 | Palmgren | B64D 11/0601 244/118.6 |
| 5,487,589 A | * | 1/1996 | Meiller | B60N 2/2209 297/344.13 |
| 6,065,795 A | * | 5/2000 | Forster | B60G 7/006 296/64 |
| 7,249,798 B2 | * | 7/2007 | Saito | B60N 2/36 296/210 |
| 7,562,934 B2 | * | 7/2009 | Swan | B60N 2/914 297/284.6 |
| 8,123,296 B2 | * | 2/2012 | Rager | B60N 2/914 297/284.3 |
| 8,955,909 B2 | | 2/2015 | Hisada et al. | |
| 10,675,992 B2 | | 6/2020 | Nishiguchi et al. | |
| 2003/0038525 A1 | * | 2/2003 | Pond | B60N 2/688 297/452.29 |
| 2008/0224511 A1 | * | 9/2008 | Herkenrath | B60N 2/3056 297/248 |
| 2014/0367949 A1 | * | 12/2014 | Baron | B60N 2/38 280/751 |

(Continued)

*Primary Examiner* — Timothy J Brindley
(74) *Attorney, Agent, or Firm* — Studebaker Brackett PLLC

(57) ABSTRACT

A utility vehicle, which includes a seat and can travel on rough terrain, is provided. The seat includes a sitting part that can seat three passengers side by side in a right-left direction that is a width direction of the vehicle, and a backrest part. The sitting part includes a first sitting part in a left region, a second sitting part in a right region, and a third sitting part in a central region, in the right-left direction. The third sitting part includes a protruding part protruding upward of the first and second sitting parts. The height of a sitting surface of the third sitting part relative to sitting surfaces of the first and second sitting parts monotonously decreases from rear to front.

14 Claims, 11 Drawing Sheets

(56) References Cited

U.S. PATENT DOCUMENTS

| | | | | |
|---|---|---|---|---|
| 2016/0257283 A1* | 9/2016 | Muto | ............... | B60R 22/26 |
| 2018/0319360 A1* | 11/2018 | Clyde | ............... | B60R 22/18 |
| 2019/0232878 A1* | 8/2019 | Welch | ............... | B60N 2/3047 |
| 2020/0079259 A1* | 3/2020 | Shinohara | ............... | A47C 7/40 |
| 2020/0198507 A1* | 6/2020 | Asahara | ............... | B60N 2/5607 |
| 2022/0031876 A1* | 2/2022 | Ubale | ............... | A61L 2/24 |
| 2024/0399943 A1* | 12/2024 | Lin | ............... | B60N 2/542 |

* cited by examiner

FIG.4
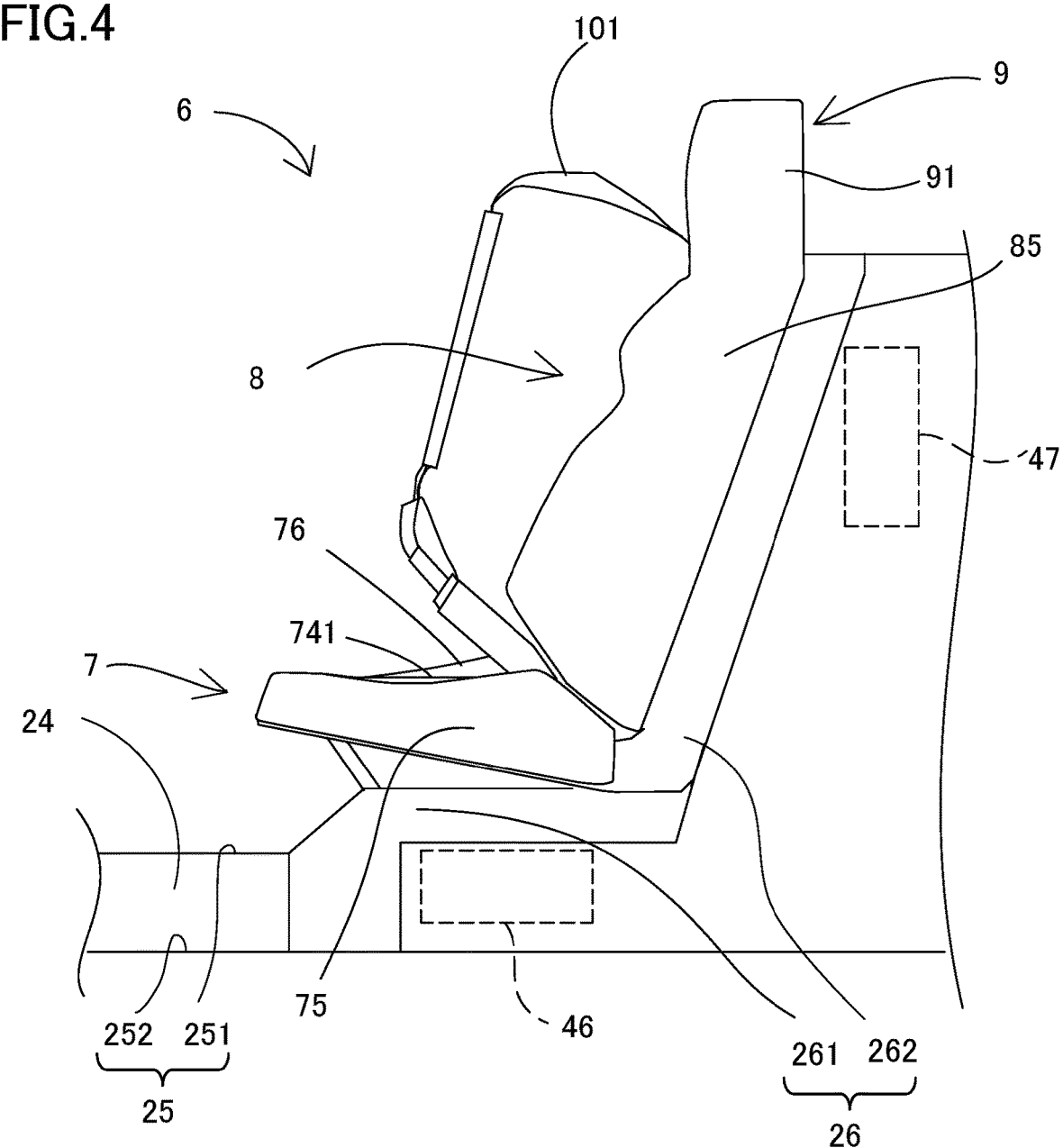
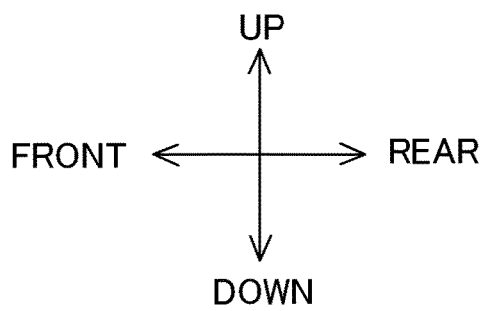

VEHICLE AND VEHICLE SEAT

TECHNICAL FIELD

The present disclosure relates to a utility vehicle capable of travelling on rough terrain and a vehicle seat.

BACKGROUND

Vehicles (Utility vehicles) capable of stably travelling even on rough terrain such as soft or uneven ground are known. It is recently desired to use such a utility vehicle, for example, for leisure with family. For example, U.S. Pat. No. 8,955,909 B2 discloses a utility vehicle having a seat that is configured to seat three passengers side by side.

SUMMARY

If a seat for three persons is configured such that a sitting surface in a central region of the seat in a vehicle width direction is higher than sitting surfaces in right and left regions of the seat, a hip point of a passenger in the central region is set at a higher level. Therefore, particularly when a small passenger such as a child is seated in the central region, such configuration advantageously secures the visibility of the small passenger. When getting in and out the seat, however, a passenger may move in a right-left direction within a cabin, for example, while raising his or her buttock above the sitting surface. Therefore, if the sitting surface in the central region of the seat is simply set higher than the sitting surfaces in the right and left regions of the seat, the amount of movement of the buttock of the passenger may increase, and passenger's ease of getting in and out may be reduced.

It is accordingly a non-limiting object of the present disclosure to provide a technique that realizes improvement in passenger's ease of getting in and out while setting a hip point of a passenger at a higher level in a central region of a seat for three persons.

According to a first aspect of the present disclosure, a utility vehicle is provided that has a seat and is capable of travelling on rough terrain. The seat has a sitting part and a backrest part. The sitting part is configured to seat three passengers side by side in a right-left direction that is a width direction of the vehicle. The sitting part includes a first sitting part in a left region, a second sitting part in a right region, and a third sitting part in a central region, in the right-left direction. The third sitting part has a protruding part protruding upward of the first and second sitting parts. The sitting part is configured such that the height of a sitting surface of the third sitting part relative to sitting surfaces of the first and second sitting parts monotonously decreases from rear to front.

In this specification, monotonous decrease means monotonous decrease in a broad sense, and can also be said as monotonous non-increase. Further, in this specification, the sitting surface can also be said as an upper surface of the sitting part.

According to a second aspect of the present disclosure, a utility vehicle is provided that has a seat and is capable of travelling on rough terrain. The seat has a sitting part and a backrest part. The sitting part is configured to seat three passengers side by side in a right-left direction that is a width direction of the vehicle. The sitting part includes a first sitting part in a left region, a second sitting part in a right region, and a third sitting part in a central region, in the right-left direction. The third sitting part has a protruding part that is provided rearward of a front end part of the sitting part and protrudes upward of the first and second sitting parts. Sitting surfaces of the first, second and third sitting parts are substantially on the same plane in the front end part of the sitting part.

According to a third aspect of the present disclosure, a seat for a utility vehicle capable of travelling on rough terrain is provided. The seat has a sitting part and a backrest part. The sitting part is configured to seat three passengers side by side in a right-left direction that is a width direction of the vehicle. The sitting part includes a first sitting part in a left region, a second sitting part in a right region, and a third sitting part in a central region, in the right-left direction. The third sitting part has a protruding part protruding upward of the first and second sitting parts. The sitting part is configured such that the height of a sitting surface of the third sitting part relative to sitting surfaces of the first and second sitting parts monotonously decreases from rear to front.

BRIEF DESCRIPTION OF THE DRAWINGS

FIG. 4 is a left side view showing the rear seat and its vicinity.

DETAILED DESCRIPTION OF THE EMBODIMENTS

First Embodiment

Figure 1:
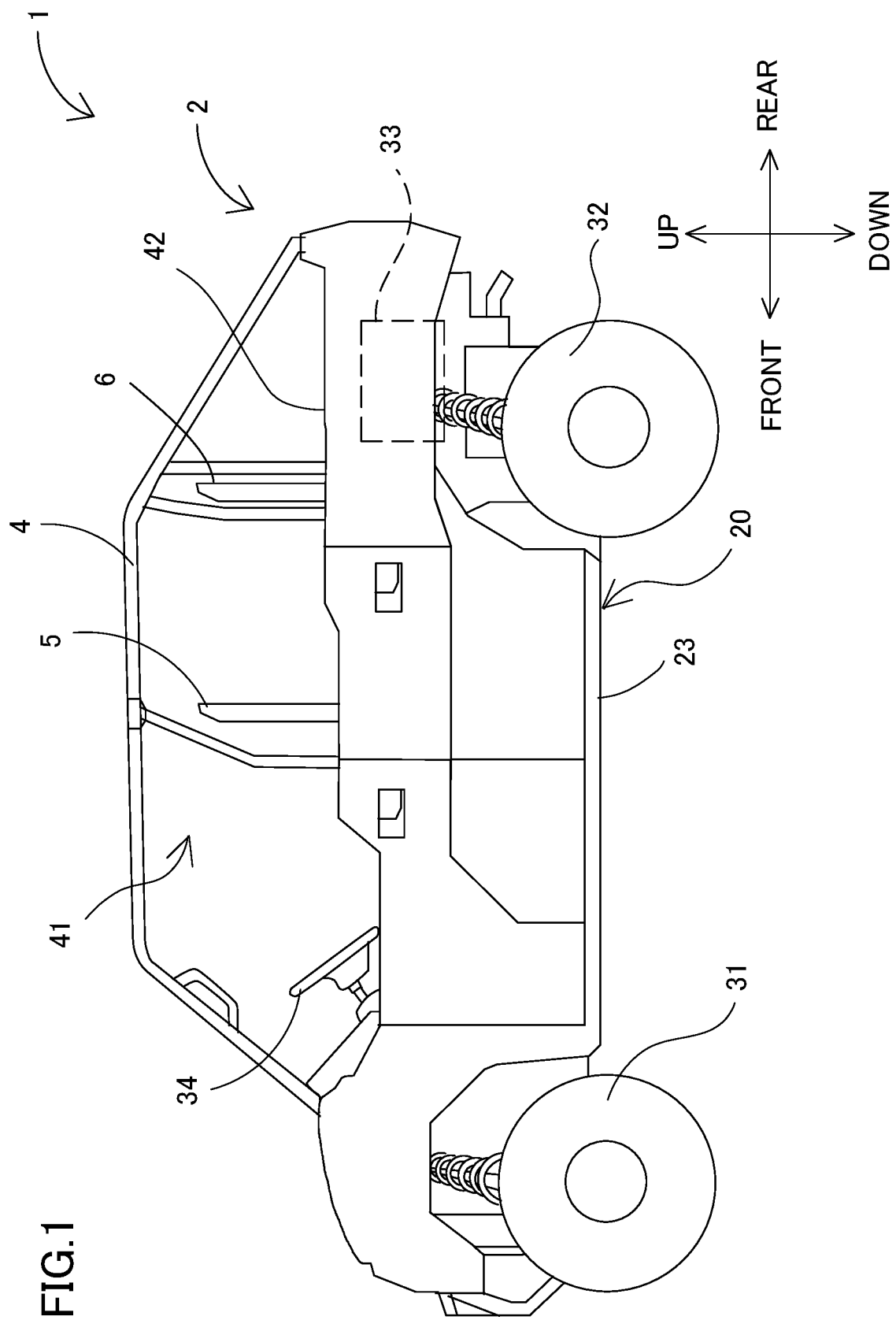
FIG. 1 is a schematic left side view of a utility vehicle according to a first embodiment of the present disclosure.

FIG. 1 is a schematic left side view of a utility vehicle 1 as a representative example of a utility vehicle according to a first embodiment of the present disclosure. Unlike a general vehicle primarily for travelling on a paved road, the utility vehicle 1 is capable of stably travelling even on rough terrain such as soft or uneven ground. In FIG. 1 and the other drawings, a front-rear direction, an up-down direction and a right-left direction of the utility vehicle 1 are shown. These directions are orthogonal to each other. The front-rear direction is also a vehicle length direction. In the front-rear direction, a direction to the front is a forward travelling direction of the utility vehicle 1, and a direction to the rear is a backward travelling direction of the utility vehicle 1. The right-left direction is also a vehicle width direction.

As shown in FIG. 1, the utility vehicle 1 includes a vehicle body 2 having a body frame 20, a pair of right and left front wheels 31 and a pair of right and left rear wheels 32, which support the vehicle body 2, and an engine 33 as a power source for travelling of the utility vehicle 1. The right and left front and rear wheels 31, 32 each have a so-called low-pressure tire.

A cabin 41 is arranged in a central region of the vehicle body 2. The cabin 41 is surrounded by a ROPS (rollover protective structure) 4. The ROPS 4 is a metal pipe material. The ROPS 4 is configured such that the front and rear, the right and left and the top of the cabin 41 are open. A front seat 5 is arranged in a front half portion of the cabin 41, and a rear seat 6 is arranged in a rear half portion of the cabin 41. A cargo bed 42 is arranged in a rear part of the cabin 41. The cargo bed 42 can be manually or automatically tilted rearward.

Figure 2:
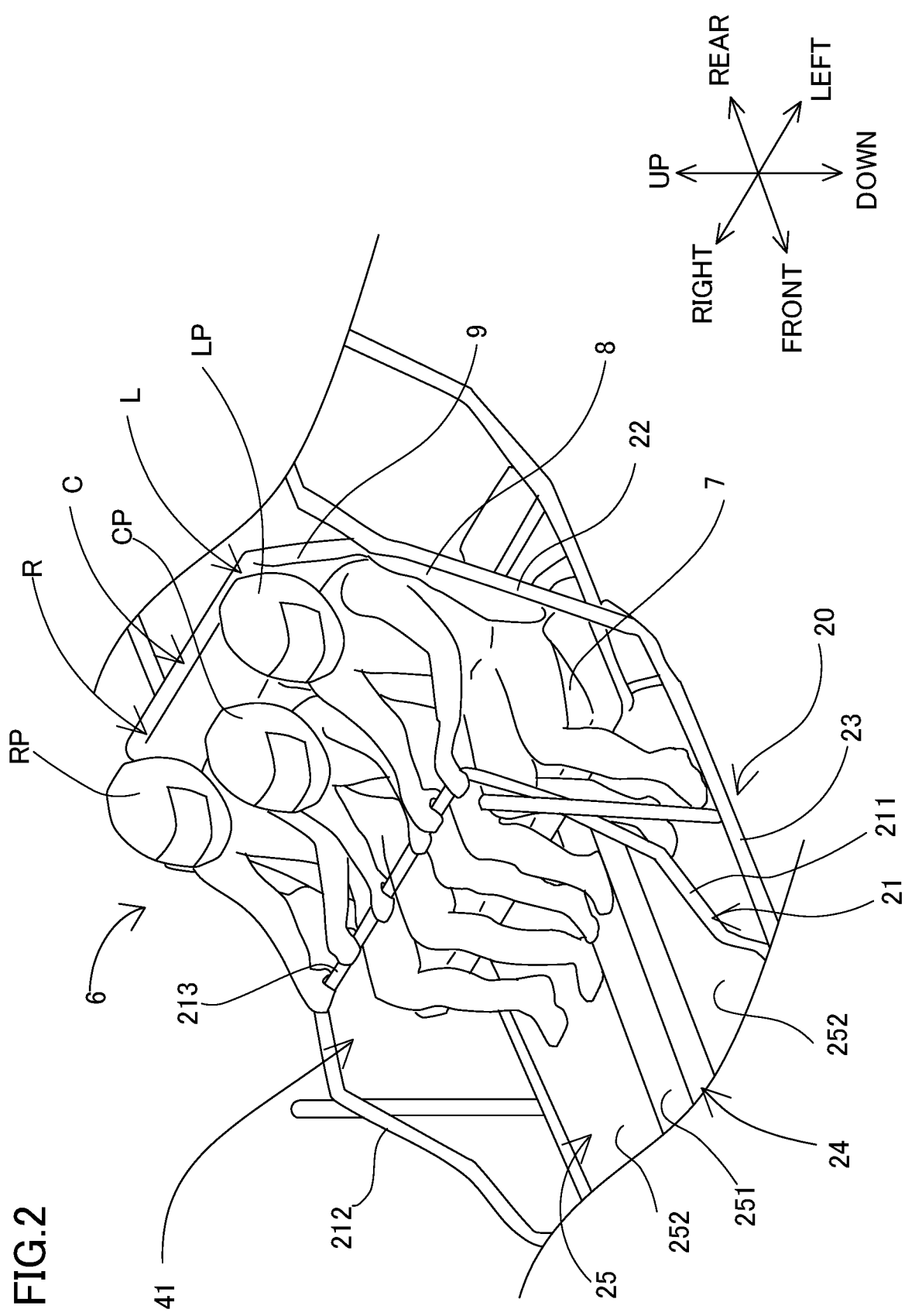
FIG. 2 is a perspective view showing part of a body frame and a rear seat on which passengers are sitting.

In FIG. 2, a lower frame 23, a first frame 21 and a second frame 22 are shown as part of the body frame 20. The body frame 20 is a frame structure formed of a sectioned material and serves as a skeleton of the vehicle body 2. The lower frame 23 is a lowermost layer of the body frame 20 and forms a floor surface 25 of the cabin 41. The lower frame 23 is also referred to as a floor panel. The first frame 21 includes a first extending part 211, a second extending part 212 and a third extending part 213. The first extending part 211 is connected to a left end part of a front half portion of the lower frame 23 and extends rearward and upward. The second extending part 212 is connected to a right end part of the front half portion of the lower frame 23 and extends rearward and upward. The third extending part 213 is connected between an upper end of the first extending part 211 and an upper end of the second extending part 212 and extends in the right-left direction. As shown in FIG. 2, the positions of the third extending part 213 in the front-rear direction and the up-down direction are adjusted to be gripped by passengers LP, CP, RP on the rear seat 6. The third extending part 213 serves as a grip bar 213. The second frame 22 is connected to a rear half portion of the lower frame 23 and extends rearward and upward.

A floor tunnel 24 is provided in a central part of the lower frame 23 in the vehicle width direction. In this embodiment, the floor tunnel 24 is integrally formed with the lower frame 23. The floor tunnel 24 may be formed separately from the lower frame 23 and mounted on the lower frame 23. Inside the floor tunnel 24, for example, a drive shaft (not shown) for transmitting power of the engine 33 to the front wheels 31 is arranged. In the following description, an upper surface of the floor tunnel 24, which forms the floor surface 25, is also referred to as a center floor surface 251. Upper surfaces on the right and left sides of the center floor surface 251, which form the floor surface 25, are also referred to as side floor surfaces 252. The center floor surface 251 is located at a level above the side floor surfaces 252 in the up-down direction.

Figure 3:
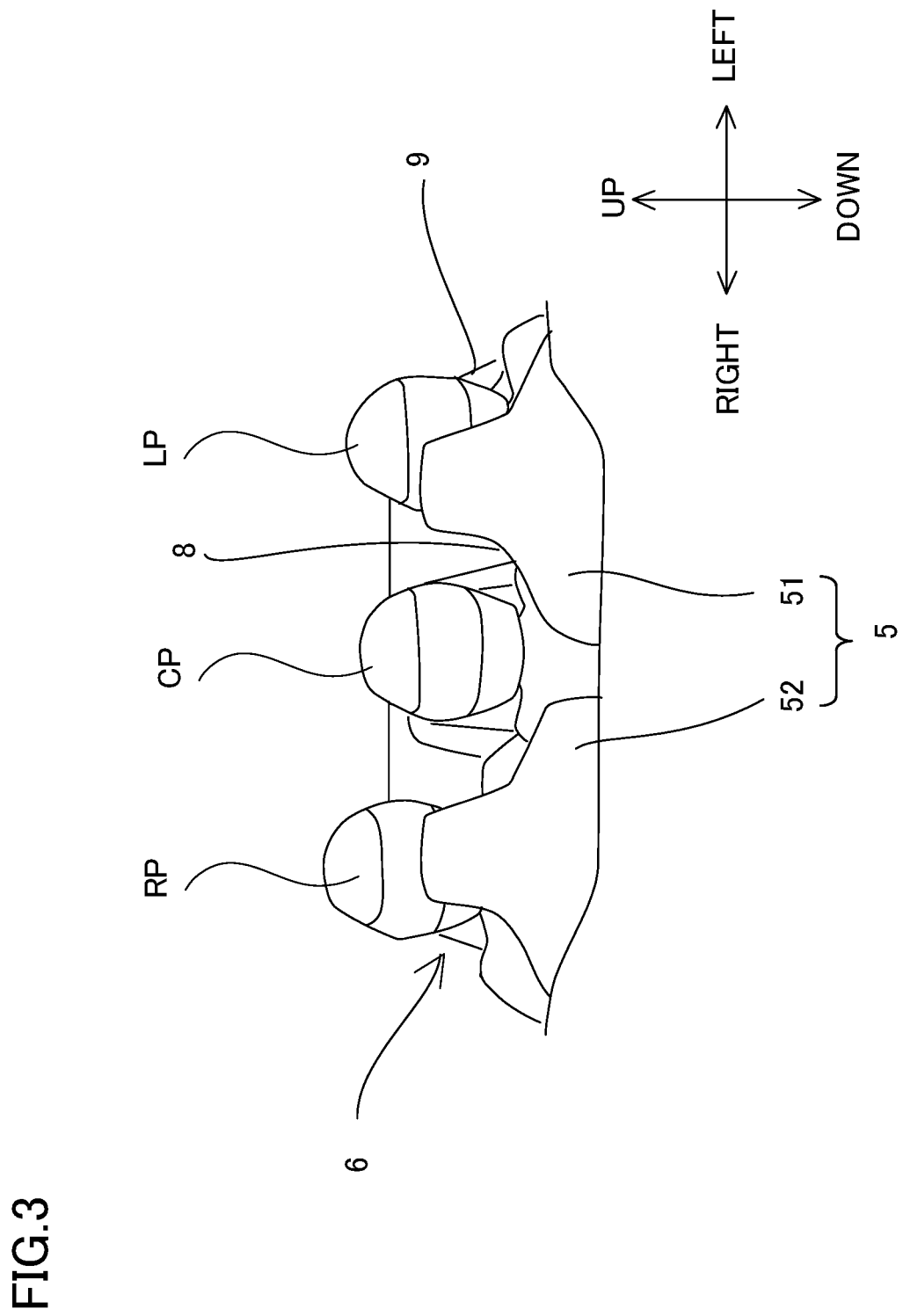
FIG. 3 shows a front seat and the rear seat on which passengers are sitting, as viewed from the front.

As shown in FIG. 3, the front seat 5 of this embodiment has a driver's seat 51 and an assistant driver's seat 52 that are separated from each other in the right-left direction. In front of the front seat 5, various kinds of operating devices such as a steering wheel 34 (see FIG. 1) and an instrument panel are provided for a driver to operate the utility vehicle 1. The floor tunnel 24 extends to a rear end of the rear seat 6 through between the driver's seat 51 and the assistant driver's seat 52. The rear seat 6 is configured to seat three passengers side by side in the right-left direction. The passenger CP in a central region of the rear seat 6 can get a forward view from between the driver's seat 51 and the assistant driver's seat 52.

The rear seat 6 is now described in detail. As shown in FIG. 2, the rear seat 6 has a sitting part 7 and a backrest part 8. The sitting part 7 is a part of the rear seat 6 on which a passenger sits. The sitting part 7 extends from a left end to a right end of the cabin 41. The backrest part 8 is a part of the rear seat 6 for supporting a back of the passenger on the sitting part 7. In this embodiment, the rear seat 6 is formed of a support material and a cushion material that are made of resin. The thicknesses of the sitting part 7 and the backrest part 8 are adjusted by at least one of the support material or the cushion material.

FIG. 4 is a schematic left side view showing the rear seat 6 and its vicinity. As shown in FIG. 4, the rear seat 6 is detachably mounted to the vehicle body 2 via a supporting part 26 provided on a rear part of the floor surface 25. The supporting part 26 includes a first supporting part 261 extending in the right-left direction on the floor surface 25, and a second supporting part 262 extending upward from a rear end part of the first supporting part 261. The supporting part 26 is formed, for example, of a metal frame material. The first supporting part 261 mainly supports the sitting part 7, and the second supporting part 262 mainly supports the backrest part 8. A battery 46 is disposed under the first supporting part 261. A fan 47 is disposed behind the second supporting part 262.

Figure 5:
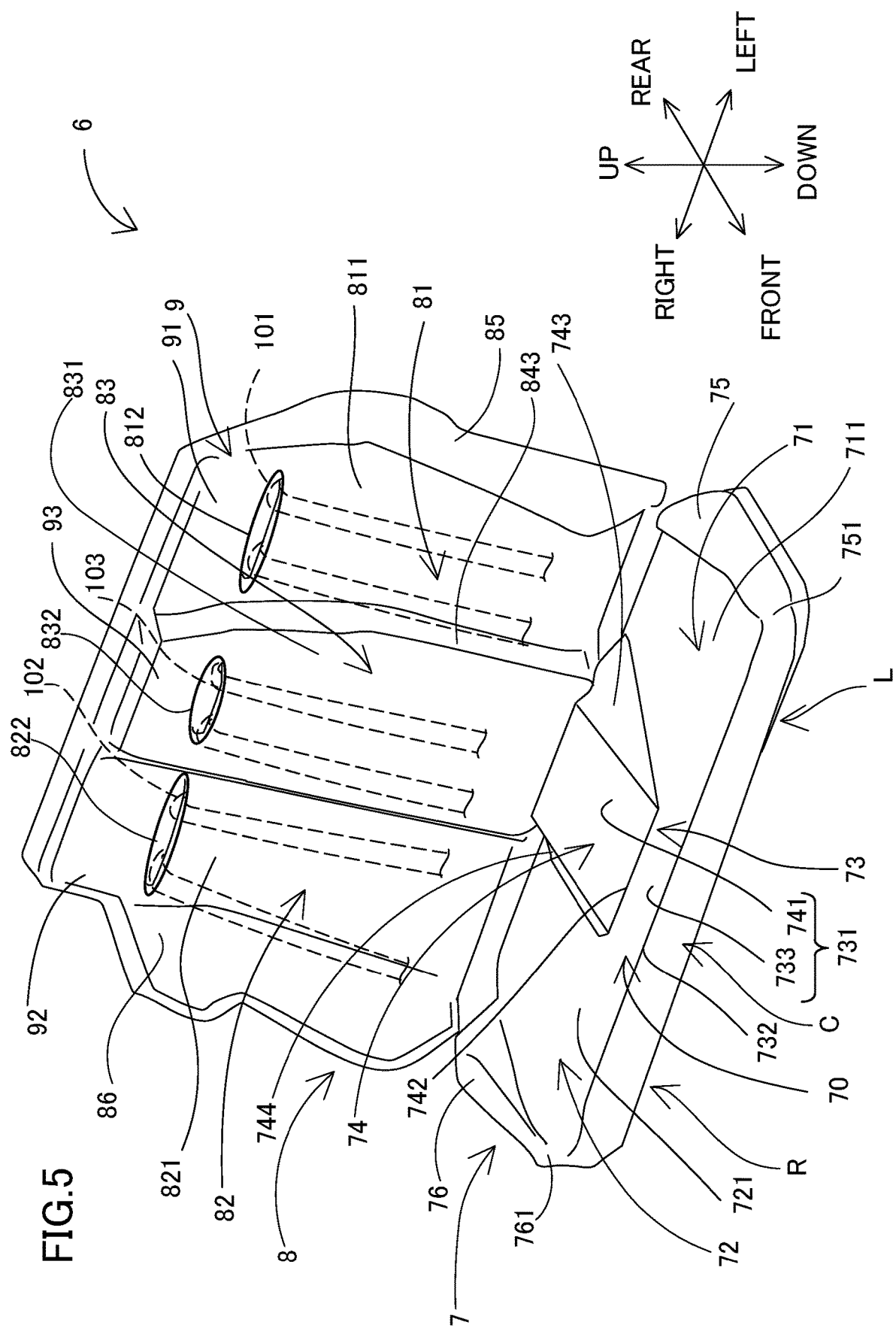
FIG. 5 is a front perspective view of the rear seat.
Figure 6:
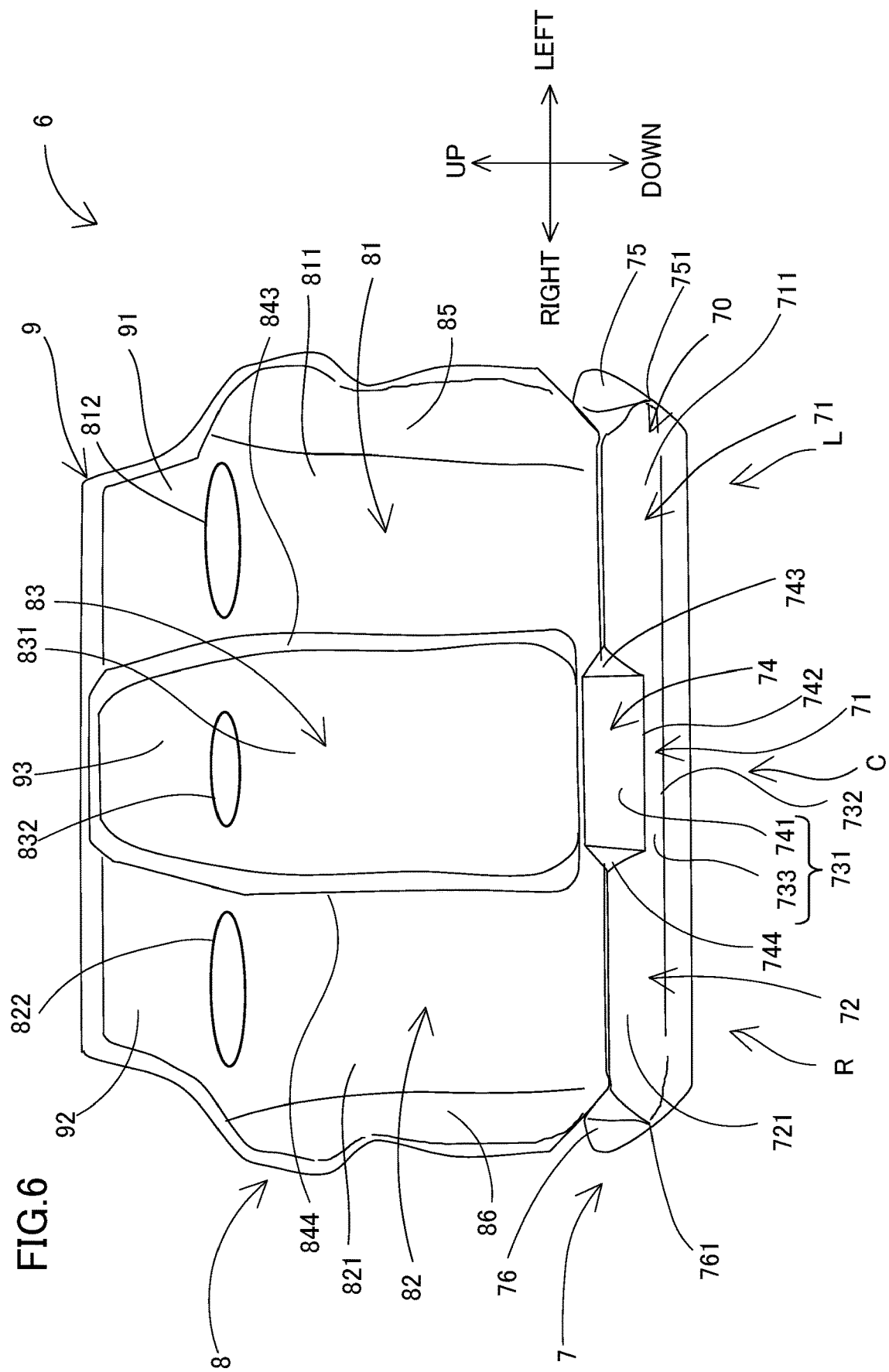
FIG. 6 is a front view of the rear seat.

FIG. 5 is a front perspective view of the rear seat 6. FIG. 6 is a front view of the rear seat 6. As shown in FIGS. 5 and 6, the sitting part 7 includes a first sitting part 71 in a left region L, a second sitting part 72 in a right region R, and a third sitting part 73 in a central region C, in the vehicle width direction. The third sitting part 73 has a protruding part 74 protruding upward of the first and second sitting parts 71, 72. The central region C is a generally central region of the seat 6 in the right-left direction. The central region C is a region of the rear seat 6 in the right-left direction in which the protruding part 74 is located. As shown in FIG. 2, the central region C is located right above the floor tunnel 24. In this embodiment, the first, second and third sitting parts 71, 72, 73 are integrally formed with each other. Passengers in the left region L, the right region R and the central region C of the rear seat 6 are hereinafter also referred to as a passenger LP, a passenger RT and a passenger CP (see FIGS. 2 and 3), respectively. Upper surfaces of the first, second and third sitting parts 71, 72, 73 are also referred to as a first sitting surface 711, a second sitting surface 721 and a third sitting surface 731, respectively. The first, second and third sitting surfaces 711, 721, 731 respectively support body parts of the passengers LP. RP, CP from the buttocks to the vicinity of the knees. In this embodiment, the first and second sitting surfaces 711, 721 are substantially on the same plane.

Figure 7:
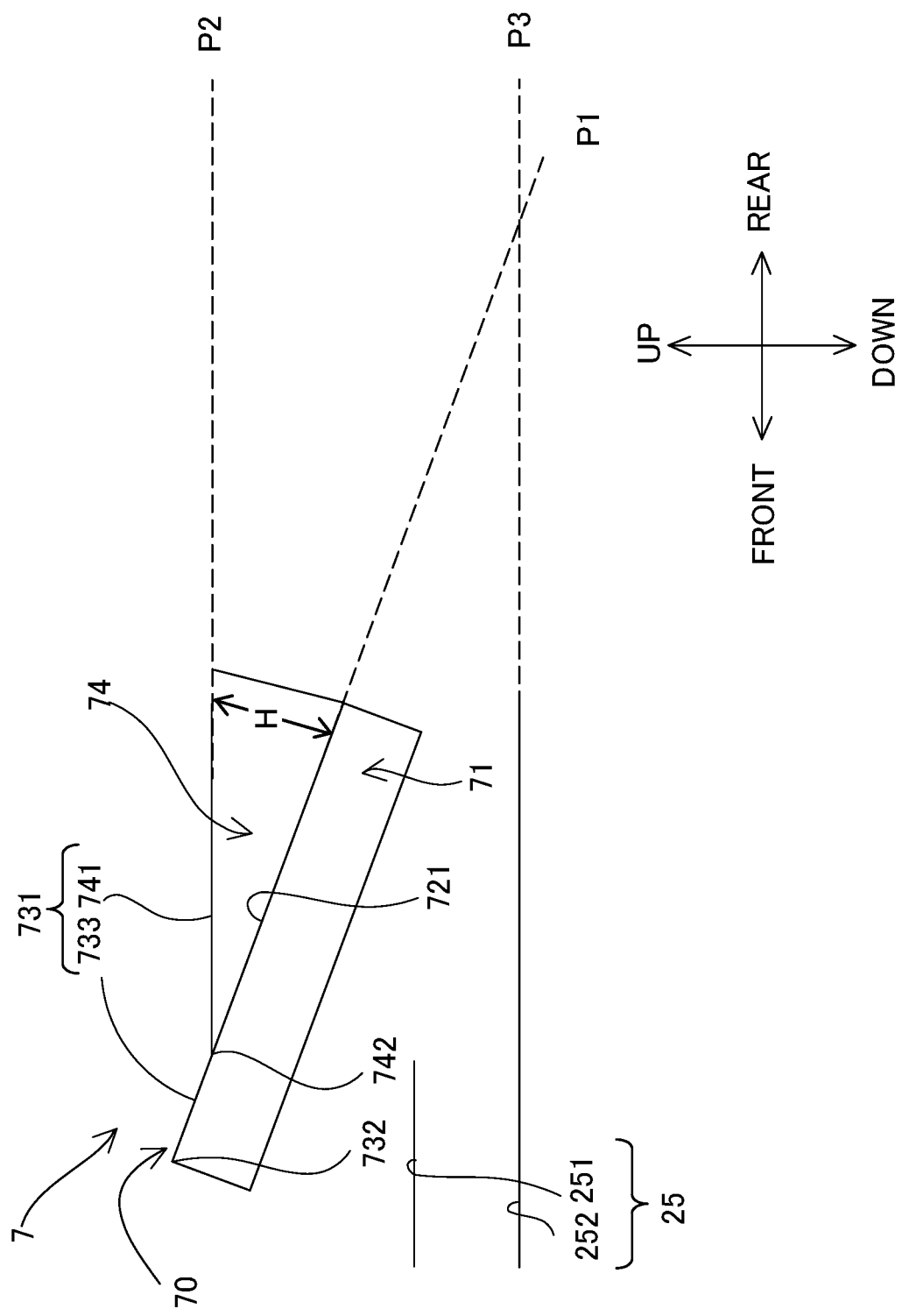
FIG. 7 is a schematic, left side view showing a sitting part, for illustrating inclination of the sitting part relative to a floor surface.

In FIG. 7, a schematic, left side view of the sitting part 7, and parts of the center floor surface 251 and the side floor surfaces 252 are shown. FIG. 7 is a drawing for illustrating inclination of the sitting part 7 relative to the floor surface 25, and the distance between the floor surface 25 and the sitting part 7 in the up-down direction is different from the actual distance therebetween. Although not shown in FIG. 7, the second sitting part 72 has a structure obtained by inverting the first sitting part 71 in the right-left direction. Thus, the second sitting part 72 has the same shape as the first sitting part 71 in the front-rear direction.

As shown in FIG. 7, in normal time when no passenger is sitting on the seat 6, the first and second sitting surfaces 711, 721 are inclined downward from the front to the rear. The first and second sitting surfaces 711, 721 are inclined downward and rearward relative to the floor surface 25. An imaginary plane P1 including the first and second sitting surfaces 711, 721 intersects with an imaginary plane P3 including the side floor surfaces 252, behind the sitting part 7.

The sitting part 7 of this embodiment is configured such that a height H of the third sitting surface 731 relative to the first and second sitting surfaces 711, 721 monotonously decreases from the rear to the front. The height H of the third sitting surface 731 corresponds to the distance between the third sitting surface 731 and the first and second sitting surfaces 711, 721. The height H can also be said as the amount of increase of the thickness of the third sitting part 73 relative to the first and second sitting parts 71, 72. That "the height H of the third sitting surface 731 monotonously decreases from the rear to the front" includes that: (i) the height H of the third sitting surface 731 gradually decreases from the rear to the front, (ii) the height H of the third sitting surface 731 decreases stepwise from the rear to the front, and (iii) combination of (i) and (ii) above. The monotonous decrease can also be said as monotonous non-increase.

As shown in FIGS. 5 and 7, a front end 742 of the protruding part 74 is located rearward of a front end 732 of the third sitting part 73. Thus, the third sitting surface 731 includes an upper surface 741 of the protruding part 74 and an upper surface 733 extending forward of the front end 742 of the protruding part 74. The upper surface 733 is located in a front end part 70 of the sitting part 7. The height H of the upper surface 741 of the protruding part 74 relative to the first and second sitting surfaces 711, 721 decreases from the rear to the front. As shown in FIG. 5, the upper surface 741 is inclined downward and forward relative to the first and second sitting surfaces 711, 721. The upper surface 733 is substantially on the same plane as the first and second sitting surfaces 711, 721. As shown in FIG. 7, in normal time when a passenger CP is not sitting on the rear seat 6, the upper surface 741 of the protruding part 74 is generally parallel to the floor surface 25. That the upper surface 741 is generally parallel to the floor surface 25 includes that the imaginary plane P2 including the upper surface 741 is substantially parallel to an imaginary plane P3 including the floor surface 25. In this embodiment, the third sitting part 73 is configured such that when the passenger CP sits on the third sitting part 73, a rear part of the protruding part 74 sinks further downward than a front part of the protruding part 74 by the weight of the passenger CP. This configuration reduces the possibility that the passenger CP unintentionally moves forward during travelling of the utility vehicle 1.

As shown in FIGS. 5 and 6, the protruding part 74 protrudes upward of the first and second sitting parts 71, 72. Thus, the protruding part 74 and the first sitting part 71 as well as the protruding part 74 and the second sitting part 72 form a step in the right-left direction. In this embodiment, a first inclined surface 743 is provided to connect the upper surface 741 of the protruding part 74 and the first sitting surface 711. The first inclined surface 743 is inclined downward to the left or toward the first sitting surface 711 from the upper surface 741. Further, a second inclined surface 744 is provided to connect the upper surface 741 and the second sitting surface 721. The second inclined surface 744 is inclined downward to the right or toward the second sitting surface 721 from the upper surface 741.

As shown in FIG. 6, the sitting part 7 further has a first support 75 and a second support 76. The first support 75 is provided at a left end of the sitting part 7. The first support 75 protrudes upward of the first sitting part 71. The height of the first support 75 relative to the first sitting surface 711 monotonously decreases from the rear to the front. The second support 76 is provided at a right end of the sitting part 7. The height of the second support 76 relative to the second sitting surface 721 monotonously decreases from the rear to the front. A front end 751 of the first support 75 and a front end 761 of the second support 76 are substantially on the same plane as the first and second sitting surfaces 711, 721 and the upper surface 733 of the third sitting surface 731.

The backrest part 8 is now described. The backrest part 8 includes a first backrest part 81 in the left region L, a second backrest part 82 in the right region R, and a third backrest part 83 in the central region C. In this embodiment, the first, second and third backrest parts 81, 82, 83 are integrally formed with each other. Front surfaces of the first, second and third backrest parts 81, 82, 83 are also referred to as a first front surface 811, a second front surface 821 and a third front surface 831, respectively. The first, second and third front surfaces 811, 821, 831 support the backs of the passengers LP, RP, CP, respectively. In this embodiment, the first and second front surfaces 811, 821 are substantially on the same plane.

The third backrest part 83 protrudes forward of the first and second backrest parts 81, 82. Thus, the third front surface 831 is located forward of the first and second front surfaces 811, 821.

As shown in FIG. 5, the first, second and third backrest parts 81, 82, 83 have a first long hole 812, a second long hole 822 and a third long hole 832, respectively. The first, second and third long holes 812, 822, 832 are formed through the first, second and third backrest parts 81, 82, 83 in the front-rear direction, respectively. The first, second and third backrest parts 81, 82, 83 are configured such that seat belts 101, 102, 103 are inserted through the backrest parts 81, 82, 83 from the rear to the front via the first, second and third long holes 812, 822, 832, respectively. In this embodiment, the first and second long holes 812, 822 have generally the same length in the right-left direction. The length of the first and second long holes 812, 822 in the right-left direction is longer than the length of the third long hole 832 in the right-left direction. Thus, the moving range of the seat belts 101, 102 in the right-left direction is longer than that of the seat belt 103. The moving range can also be referred to as a moving width or moving distance.

As described above, the third backrest part 83 protrudes forward of the first and second backrest parts 81, 82. Thus, the third backrest part 83 and the first backrest part 81 as well as the third backrest part 83 and the second backrest part 82 form a stepped shape in the right-left direction. In this embodiment, the third front surface 831 is connected to the first front surface 811 by a third inclined surface 843. The third inclined surface 843 is inclined rearward to the left or toward the first front surface 811 from the third front surface 831. Further, the third front surface 831 is connected to the second front surface 821 by a fourth inclined surface 844. The fourth inclined surface 844 is inclined rearward to the right or toward the second front surface 821 from the third front surface 831.

The backrest part 8 further has a third support 85 and a fourth support 86. The third support 85 is provided at a left end of the backrest part 8. The third support 85 protrudes forward of the first backrest part 81. The fourth support 86 is provided at a right end of the backrest part 8. The fourth support 86 protrudes forward of the second backrest part 82.

The rear seat 6 of this embodiment further has a headrest 9. The headrest 9 includes a first headrest 91 in the left region L, a second headrest 92 in the right region R, and a third headrest 93 in the central region C, in the vehicle width direction. The first, second and third headrests 91, 92, 93 are provided above the first, second and third long holes 812, 822, 832, respectively. The third headrest 93 protrudes forward of the first and second headrests 91, 92. In this embodiment, the headrest 9 is integrally formed with the backrest part 8. The headrest 9 may be formed separately from the backrest part 8 and detachably mounted to the backrest part 8.

Effects of the first embodiment are now described.

According to the first embodiment, the third sitting part 73 in the central region C of the sitting part 7 has the protruding part 74 protruding upward of the first and second sitting parts 71, 72. Thus, a hip point of the passenger CP on the third sitting part 73 is set at a higher level. Therefore, the visibility of the passenger CP is secured even if the passenger CP is relatively small. Further, the height of the third sitting surface 731 relative to the first and second sitting surfaces 711, 721 monotonously decreases from the rear to the front. With this configuration, a passenger on the rear seat 6 can easily move on a front part (the front end part 70) of the sitting part 7 in the right-left direction, so that passenger's ease of getting in and out is improved. Further, the protruding part 74 protrudes upward of the first and second sitting parts 71, 72. Therefore, when the utility vehicle 1 turns, the protruding part 74 supports the right side of the buttock of the passenger LP on the first sitting part 71 and the left side of the buttock of the passenger RP on the second sitting part 72. Further, by the presence of the protruding part 74 of the third sitting part 73, a passenger can easily distinguish the three sitting regions.

The first sitting surface 711, the second sitting surface 721 and the upper surface 733 are substantially on the same plane in the front end part 70 of the sitting part 7. In other words, the sitting part 7 does not have a stepped shape and thus has no substantial height difference in the right-left direction in the front end part 70. With this configuration, a passenger can more easily move on the front part of the sitting part 7 in the right-left direction, so that passenger's ease of getting in and out is further improved.

With the configuration of the first and second sitting parts 71, 72 inclined downward from the front to the rear, the passengers LP, RP can easily sit deeply on the first and second sitting parts 71, 72. Accordingly, the riding comfort on the rear seat 6 is improved.

The sitting part 7 has the first support 75 provided at the left end and protruding upward of the first sitting part 71 and the second support 76 provided at the right end and protruding upward of the second sitting part 72. The first sitting part 71 provided between the first support 75 and the protruding part 74 can support the both sides of the buttock of the passenger LP, for example, when the utility vehicle 1 turns. Similarly, the second sitting part 72 provided between the second support 76 and the protruding part 74 can support the both sides of the buttock of the passenger RP, for example, when the utility vehicle 1 turns.

Further, the sitting part 7 has the first inclined surface 743 that connects the upper surface 741 of the protruding part 74 and the first sitting surface 711, and the second inclined surface 744 that connects the upper surface 741 and the front end 742. The first inclined surface 743 is inclined downward to the left from the upper surface 741, and the second inclined surface 744 is inclined downward to the right from the upper surface 741. Compared with a structure in which a connecting surface between the upper surface 741 and the first sitting surface 711 is orthogonal to the right-left direction, the first inclined surface 743 conforms to the body shape of the right side of the buttock of the passenger LP, so that the riding comfort of the passenger LP is improved. Similarly, compared with a structure in which a connecting surface between the upper surface 741 and the second sitting surface 721 is orthogonal to the right-left direction, the second inclined surface 744 conforms to the body shape of the left side of the buttock of the passenger RP, so that the riding comfort of the passenger RP is improved.

The heights of the first and second supports 75, 76 monotonously decrease from the rear to the front, so that presence of the first and second supports 75, 76 suppresses reduction in passenger's ease of getting in and out. Further, the front end 751 of the first support 75 and the front end 761 of the second support 76 are substantially on the same plane as the first and second sitting surfaces 711, 721 and the upper surface 733 of the third sitting surface 731. Therefore, according to this embodiment, the both sides of the buttocks of the passengers LP. RP are supported and passenger's ease of getting in and out is improved.

The third backrest part 83 protrudes forward of the first and second backrest parts 81, 82. Thus, the hip point of the passenger CP on the third sitting part 73 is set further forward than those of the passenger LP on the first sitting part 71 and the passenger RP on the second sitting part 72. Therefore, feet of the passenger CP more easily reach the floor surface 25 even if the passenger CP is relatively small. Thus, the riding posture of the passenger CP on the third sitting part 73 is stabilized. The rear seat 6 having such a structure of helping stabilize the riding posture is suitable for the utility vehicle 1 for travelling on rough terrain.

Further, the utility vehicle 1 has the floor tunnel 24 right below the third sitting part 73. Therefore, the feet of the passenger CP easily reach the center floor surface 251 that is the upper surface of the floor tunnel 24, even if the passenger CP is relatively small. Thus, the riding posture of the passenger CP on the third sitting part 73 is further stabilized.

The utility vehicle 1 further has the grip bar 213 connected to the vehicle body 2 and extending in the right-left direction in front of the rear seat 6. The third backrest part 83 protrudes forward of the first and second backrest parts 81, 82, so that the hip point of the passenger CP is set further forward. Thus, the distance between the grip bar 213 and the passenger CP on the third sitting part 73 can be shorter than the distance between the grip bar 213 and the passengers LP, RP on the first and second sitting parts 71, 72. Therefore, feet of the passenger CP more easily reach the floor surface 25 even if the passenger CP is relatively small. Thus, the riding postures of all the passengers LP, RP, CP on the rear seat 6 are stabilized. Further, compared with a structure in which only a part of a grip bar that corresponds to the central region C is formed to protrude rearward such that hands of the passenger CP can easily reach, ease of the passengers LP, RP, CP getting in and out is improved.

The first and second long holes 812, 822 are longer than the third long hole 832 in the right-left direction, so that the moving range of the seat belts 101, 102 in the right-left direction is longer than that of the seat belt 103. Therefore, the passengers LP, RP on the first and second sitting parts 71, 72 can easily pull the respective seat belts 101, 102 to desired positions in the right-left direction. Further, the passengers LP, RP can easily move their respective contact positions between their own upper half bodies and the seat belts 101, 102 to desired positions in the right-left direction. Therefore, the riding comfort of the passengers LP, RP wearing the seat belts 101, 102 is improved even if the passengers LP, RP are relatively large.

The rear seat 6 is detachably mounted to the vehicle body 2 via the supporting part 26 provided on the rear part of the floor surface 25. Therefore, according to this embodiment, for example, where the utility vehicle 1 is used with family, the rear seat 6 is mounted to the vehicle body 2, and the rear seat 6 can also be replaced with a normal seat not having the protruding part 74 according to the growth of a child.

The first, second and third sitting parts 71, 72, 73 are integrally formed with each other. Thus, compared with a structure in which, for example, a child seat (booster seat) is detachably mounted in the central region C of a seat in which upper surfaces of sitting parts are substantially on the same plane, the sitting part in the central region C is prevented from being displaced when the utility vehicle 1 turns. Therefore, according to this embodiment, the seat 6 suitable for utility vehicles for travelling on rough terrain, and the utility vehicle 1 are provided.

Second Embodiment

Figure 8:
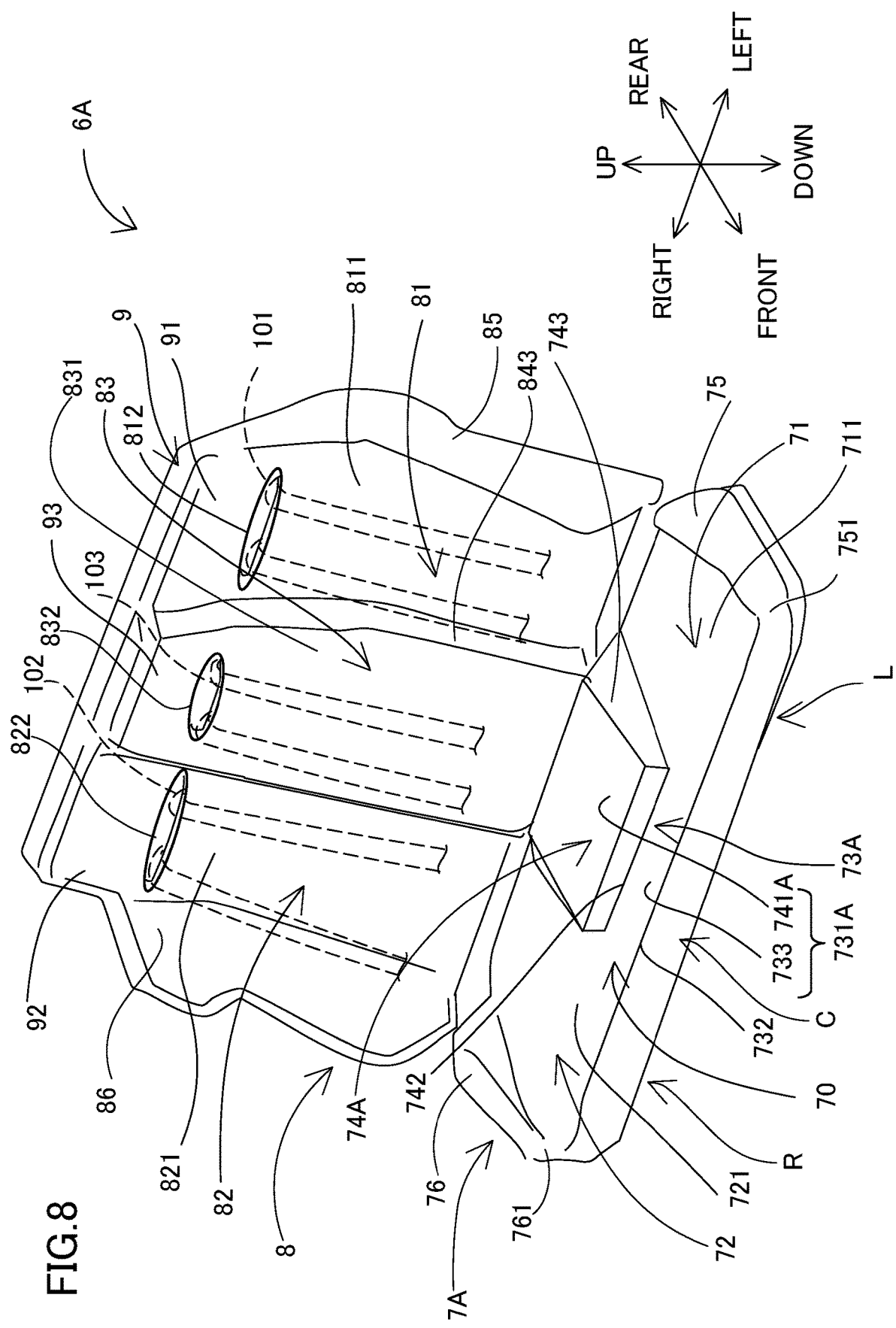
FIG. 8 is a front perspective view of a rear seat according to a second embodiment of the present disclosure.
Figure 9:
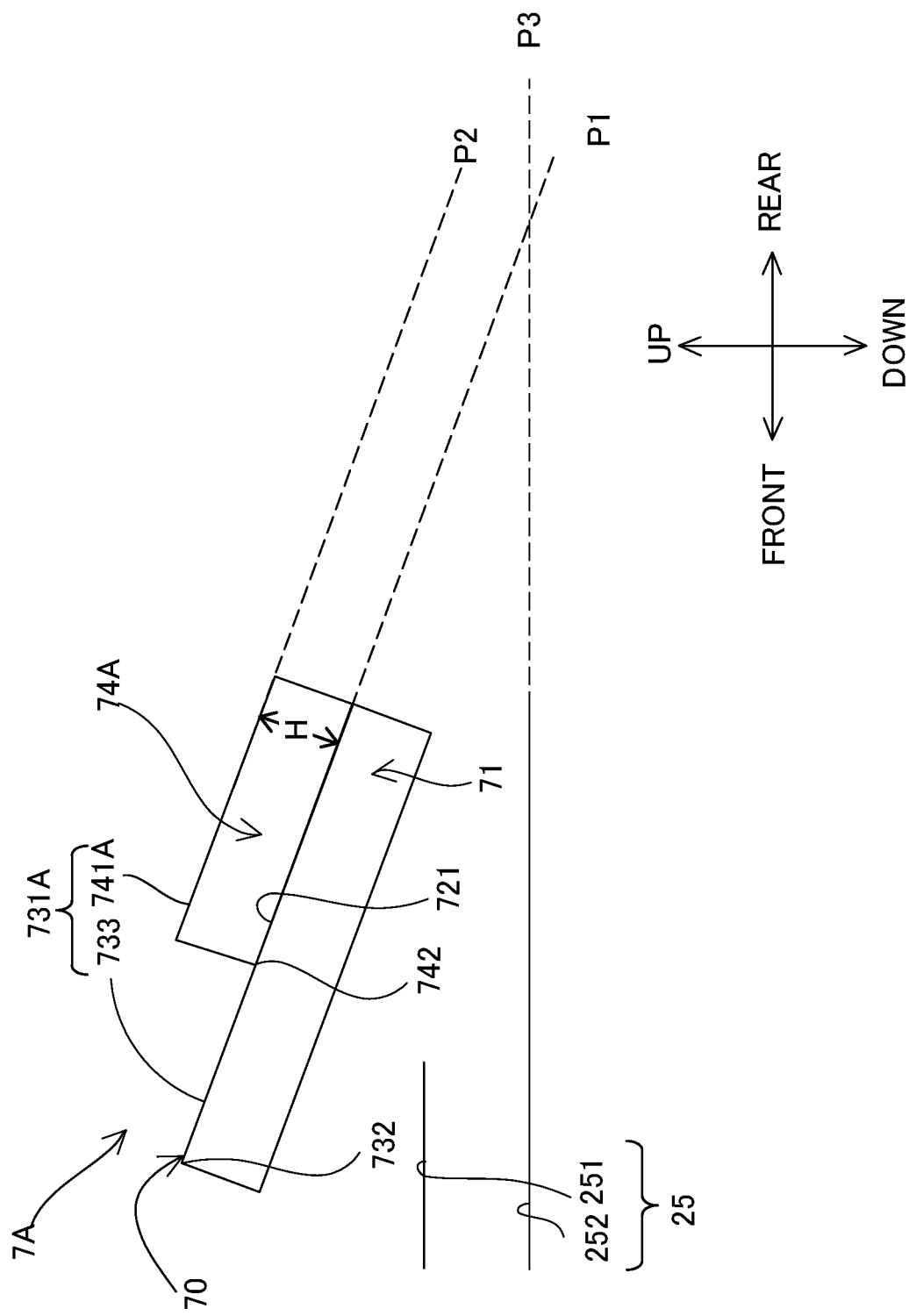
FIG. 9 is a schematic, left side view of a sitting part according to the second embodiment, for illustrating inclination of the sitting part relative to a floor surface.

In the following description, components or structures which are substantially identical to those of the above-described first embodiment are given the same numerals as in the first embodiment and are not described and shown in detail. FIG. 8 is a front perspective view of a seat 6A according to the second embodiment. FIG. 9 is a schematic, left side view of a sitting part 7A according to the second embodiment, for illustrating inclination of the sitting part 7A relative to the floor surface 25. FIGS. 8 and 9 correspond to FIGS. 6 and 7 described in the first embodiment, respectively.

The seat 6A has a protruding part 74 having an upper surface 741A that is generally parallel to the first and second sitting surfaces 711, 721. In other words, in the second embodiment, the imaginary plane P2 is generally parallel to the imaginary plane P1. Like in the first embodiment, a front end 742 of the protruding part 74A is located rearward of a front end 732 of a third sitting part 73A. Thus, a third sitting surface 731A includes an upper surface 741A of the protruding part 74A and an upper surface 733 extending forward of the front end 742 of the protruding part 74A. The upper surface 733 is located in a front end part 70 of the sitting part 7A, and is substantially on the same plane as the first and second sitting surfaces 711, 721. Thus, the height H of the third sitting surface 731A relative to the first and second sitting surfaces 711, 721 decreases stepwise from the upper surface 741A of the protruding part 74A to the upper surface 733, or from the rear to the front. The other structurers of the rear seat 6A and the utility vehicle in the second embodiment are identical to those of the first embodiment and are therefore not described.

According to the second embodiment, the third sitting part 73A in the central region C of the sitting part 7A has the protruding part 74A protruding upward of the first and second sitting parts 71, 72. Thus, a hip point of a passenger CP on the third sitting part 73A is set at a higher level. Therefore, the visibility of the passenger CP is secured even if the passenger CP is relatively small. Further, the height of the third sitting surface 731A relative to the first and second sitting surfaces 711, 721 monotonously decreases from the rear to the front, so that a passenger can easily move on the front part (the front end part 70) of the sitting part 7 in the right-left direction. Therefore, like in the first embodiment, passenger's ease of getting in and out is improved.

The upper surface 741A of the protruding part 74A is parallel to the first and second sitting surfaces 711, 721. Thus, in normal time when no passenger is sitting on the rear seat 6A, like the first and second sitting surfaces 711, 721, the upper surface 741A of the protruding part 74A is inclined downward from the front to the rear. Therefore, the passenger CP can easily sit deeply on the third sitting parts 73A. Accordingly, the riding comfort on the seat 6A is improved.

Third Embodiment

Figure 10:
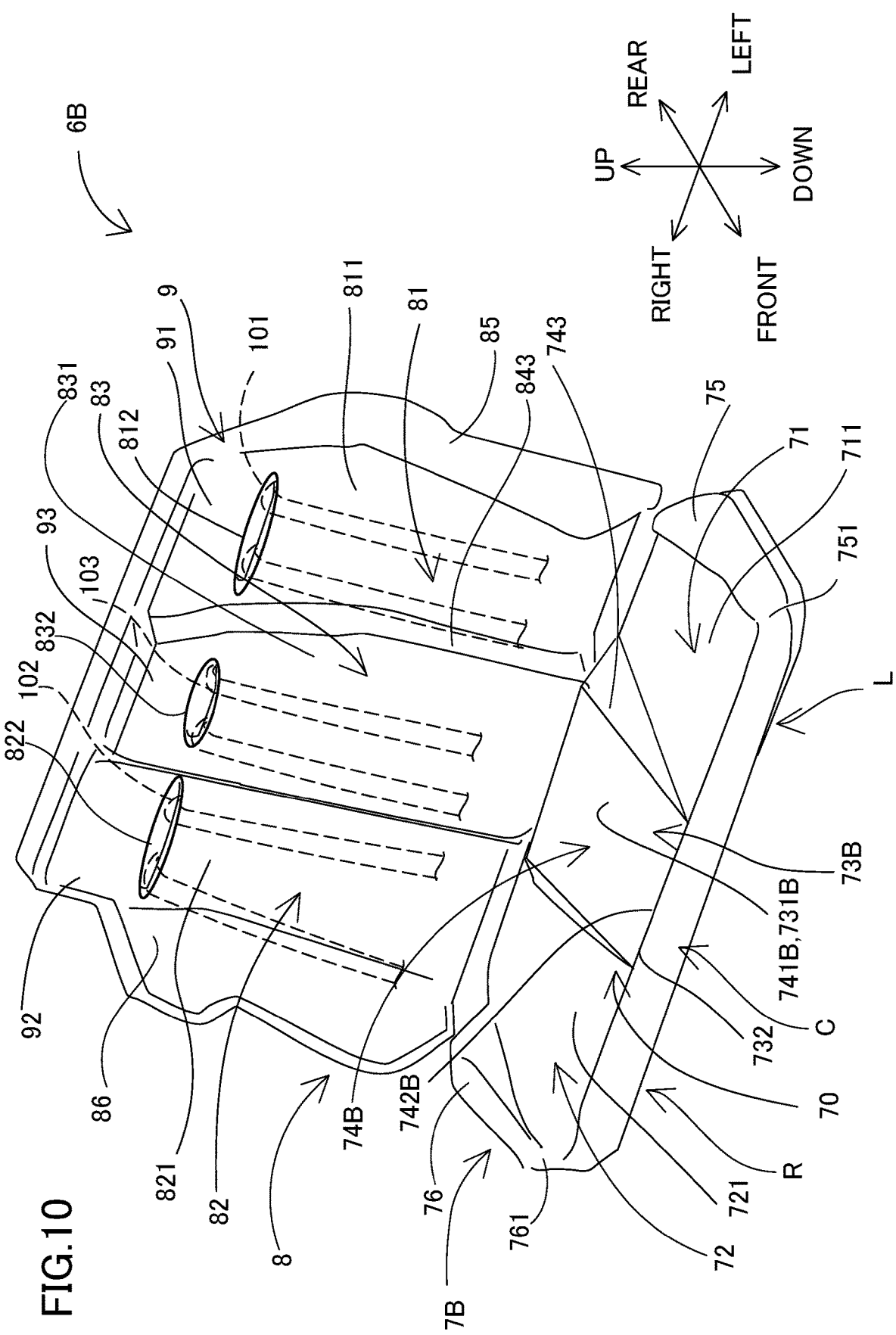
FIG. 10 is a front perspective view of a rear seat part according to a third embodiment of the present disclosure.
Figure 11:
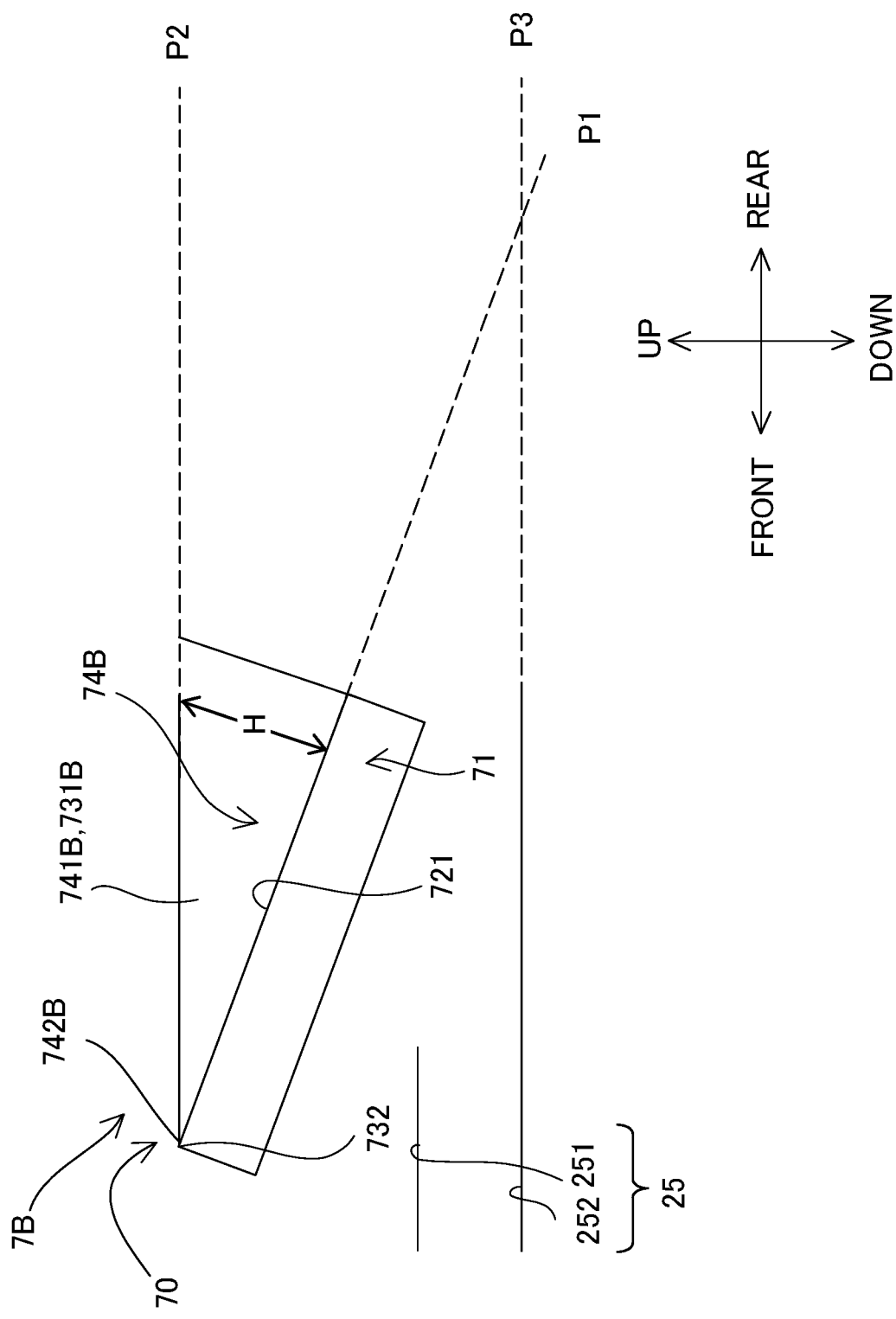
FIG. 11 is a schematic, left side view of a sitting part according to the third embodiment, for illustrating inclination of the sitting part relative to a floor surface.

FIG. 10 is a front perspective view of a seat 6B according to a third embodiment of the present disclosure. FIG. 11 is a schematic, left side view of a sitting part 7B according to the third embodiment, for illustrating inclination of the sitting part 7B relative to the floor surface 25. FIGS. 10 and 11 correspond to FIGS. 6 and 7 described in the first embodiment, respectively.

A third sitting part 73B of the rear seat 6B is different from that of the first embodiment in that a front end 742B of a protruding part 74B is located in the same position as the front end 732 of the third sitting part 73B. In this embodiment, a third sitting surface 731B is formed only by an upper surface 741B of the protruding part 74B. The height H of the upper surface 741B of the protruding part 74B relative to the first and second sitting surfaces 711, 721 gradually decreases from the rear to the front. The upper surface 741B is inclined downward and forward relative to the first and second sitting surfaces 711, 721. The third sitting surface 731B has no stepped part in the front-rear direction. The other structurers of the rear seat 6B and the utility vehicle in the third embodiment are identical to those of the first embodiment and are therefore not described.

According to the third embodiment, like in the above-described embodiments, the third sitting part 73B in the central region C of the sitting part 7B has the protruding part 74B protruding upward of the first and second sitting parts 71, 72. Further, the height of the third sitting surface 731B relative to the first and second sitting surfaces 711, 721 monotonously decreases from the rear to the front, so that a passenger can easily move on the front part (the front end part 70) of the sitting part 7B in the right-left direction. Therefore, according to the third embodiment, like in the first embodiment, a hip point of a passenger CP on the third sitting part 73B is set at a higher level, and passenger's ease of getting in and out is improved.

According to the third embodiment, the third sitting surface 731B is formed only by the upper surface 741B of the protruding part 74B, and the height of the upper surface 741B of the protruding part 74B relative to the first and second sitting surfaces 711, 721 gradually decreases from the rear to the front. Thus, the third sitting surface 731B has no stepped part in the front-rear direction. Therefore, according to the third embodiment, the riding comfort of the passenger CP on the third sitting part 73B is improved.

Other Embodiments

In each of the above-described embodiments, the seat 6, 6A, 6B may be arranged not in the rear half portion of the cabin 41, but in the front half portion of the cabin 41. According to this embodiment, a front seat is provided that is configured to seat three passengers side by side. The hip point of the passenger CP in the central region C of the front seat is set at a higher level, so that the visibility of the passenger CP is secured even if the passenger CP is relatively small. Further, the ease for a front-seat passenger in getting in and out is improved.

In each of the above-described embodiments, the sitting part 7, 7A, 7B may have a recess at the rear end. For example, the recess may be configured to allow tilting of the backrest part 8. This recess does not support a body part of a passenger from the buttock to the vicinity of the knees, so that the recess is not included in the first sitting surface 711, the second sitting surface 721, and the third sitting surface 731, 731A, 731B.

The utility vehicle 1 need not have the floor tunnel 24. The floor surface 25 right below the third sitting part 73, 73A, 73B may be substantially on the same plane as the side floor surface 252. According to this embodiment, the floor surface 25 has no stepped part, so that passenger's ease of getting in and out is improved. Where the utility vehicle 1 has the floor tunnel 24, it is preferable that the third sitting part 73, 73A, 73B overlaps at least part of the floor tunnel 24 in the right-left direction. According to this embodiment, feet of the passenger CP on the third sitting part 73 easily reach the center floor surface 251 even if the passenger CP is relatively small, so that the posture of the passenger CP is stabilized.

The sitting part 7, 7A, 7B need not have the first and second supports 75, 76 from the viewpoint of improving passenger's ease of getting in and out. The left and right ends of the sitting part 7, 7A, 7B may be substantially on the same plane as the first and second sitting surfaces 711, 721.

The third backrest part 83 need not protrude forward of the first and second backrest parts 81, 82. For example, the first, second and third front surfaces 811, 821, 831 of the first, second and third backrest parts 81, 82, 83 may be substantially on the same plane. According to this embodiment, the hip point of the passenger CP on the third sitting part 73, 73A, 73B is also set at a higher level, so that the visibility of the passenger CP is secured.

The first and second sitting surfaces 711, 721 need not be inclined downward from the front to the rear. For example, the first and second sitting surfaces 711, 721 may be generally parallel to the floor surface 25. According to this embodiment, where the third sitting part has the protruding part 74, the hip point of the passenger CP on the third sitting part is also set at a higher level, so that the visibility of the passenger CP is secured.

The present disclosure is not limited to the above-described embodiments, but rather, may be embodied in various other aspects without departing from the spirit and scope of the present disclosure. For example, the present disclosure can also be embodied in the following aspects. The technical features of the above-described embodiments corresponding to the technical features of the following aspects can be appropriately replaced or combined with each other in order to realize part or the whole of the object of the present disclosure or to realize part or all of the effects of the present disclosure. Further, the technical features can be appropriately deleted unless described as essential in the specification of the present disclosure.

The invention claimed is:

1. A utility vehicle, which includes a seat and can travel on rough terrain, wherein:
   the seat includes a sitting part that can seat three passengers side by side in a right-left direction that is a width direction of the vehicle, and a backrest part,
   the sitting part includes a first sitting part in a left region, a second sitting part in a right region, and a third sitting part in a central region, in the right-left direction, the third sitting part having a protruding part protruding upward of the first and second sitting parts,
   the protruding part has a front end disposed rearward of a front end part of the sitting part, and
   a height of a sitting surface of the third sitting part relative to sitting surfaces of the first and second sitting parts monotonously decreases from rear to front.

2. The vehicle as defined in claim 1, wherein the sitting surfaces of the first, second and third sitting parts are substantially on the same plane in a front end part of the sitting part.

3. The vehicle as defined in claim 1, wherein the sitting surfaces of the first and second sitting parts are inclined downward from front to rear.

4. The vehicle as defined in claim 1, wherein a height of an upper surface of the protruding part relative to the sitting surfaces of the first and second sitting parts gradually decreases from a rear of the upper surface of the protruding part to the front end of the protruding part.

5. The vehicle as defined in claim 1, wherein:
   the sitting part includes a first support that is provided at a left end in the right-left direction and protrudes upward of the first sitting part, and a second support that is provided at a right end in the right-left direction and protrudes upward of the second sitting part, and
   a height of the first support relative to the sitting surface of the first sitting part and a height of the second support relative to the sitting surface of the second sitting part monotonously decrease from rear to front.

6. The vehicle as defined in claim 1, wherein the first, second and third sitting parts are integrally formed with each other.

7. The vehicle as defined in claim 1, wherein:
   the backrest part includes a first backrest part in the left region, a second backrest part in the right region, and a third backrest part in the central region, and
   the third backrest part protrudes forward of the first and second backrest parts.

8. The vehicle as defined in claim 7, further comprising a grip bar that extends in the right-left direction in front of the seat and is connected to a vehicle body of the vehicle.

9. The vehicle as defined in claim 7, wherein:
   the first backrest part includes a first long hole that extends in the right-left direction and is configured such that a seat belt is inserted through the first backrest part from rear to front,
   the second backrest part includes a second long hole that extends in the right-left direction and is configured such that a seat belt is inserted through the second backrest part from rear to front,
   the third backrest part includes a third long hole that extends in the right-left direction and is configured such that a seat belt is inserted through the third backrest part from rear to front, and
   the first and second long holes are longer than the third long hole in the right-left direction.

10. The vehicle as defined in claim 7, wherein the seat further includes a first headrest provided on an upper end of the first backrest part, a second headrest provided on an upper end of the second backrest part, and a third headrest provided on an upper end of the third backrest part.

11. The vehicle as defined in claim 1, wherein the seat is a rear seat provided in a rear half portion of a cabin of the vehicle.

12. The vehicle as defined in claim 1, further comprising a floor tunnel that protrudes upward of floor surfaces corresponding to the left and right regions and extends in the front-rear direction of the vehicle right below the third sitting part.

13. A seat for a utility vehicle for travelling on rough terrain, comprising:
   a sitting part that can seat three passengers side by side in a right-left direction that is a width direction of the vehicle, and a backrest part, wherein:
the sitting part includes a first sitting part in a left region, a second sitting part in a right region, and a third sitting part in a central region, in the right-left direction, the third sitting part having a protruding part protruding upward of the first and second sitting parts,
the protruding part has a front end disposed rearward of a front end part of the sitting part, and
a height of a sitting surface of the third sitting part relative to sitting surfaces of the first and second sitting parts monotonously decreases from rear to front.

14. A utility vehicle, which includes a seat and can travel on rough terrain, wherein:
the seat includes a sitting part that can seat three passengers side by side in a right-left direction that is a width direction of the vehicle, and a backrest part,
the sitting part includes a first sitting part in a left region, a second sitting part in a right region, and a third sitting part in a central region, in the right-left direction, the third sitting part having a protruding part protruding upward of the first and second sitting parts,
the protruding part has a front end disposed rearward of a front end part of the sitting part,
a sitting surface of the third sitting part includes an upper surface of the protruding part and an upper surface extending forward of the front end of the protruding part, and
a height of the sitting surface of the third sitting part relative to sitting surfaces of the first and second sitting parts decreases stepwise from rear to front.

* * * * *